US008585053B2

(12) United States Patent
Doan

(10) Patent No.: US 8,585,053 B2
(45) Date of Patent: Nov. 19, 2013

(54) DOCUMENT GUIDE SYSTEMS AND METHODS EMPLOYING A DOCUMENT PLATEN

(75) Inventor: Thang Doan, Garland, TX (US)

(73) Assignee: De La Rue North America Inc., Irving, TX (US)

( * ) Notice: Subject to any disclaimer, the term of this patent is extended or adjusted under 35 U.S.C. 154(b) by 0 days.

(21) Appl. No.: 13/327,430

(22) Filed: Dec. 15, 2011

(65) Prior Publication Data
US 2013/0154181 A1 Jun. 20, 2013

(51) Int. Cl.
*H04N 1/04* (2006.01)

(52) U.S. Cl.
USPC ............ 271/264; 271/272; 271/275; 358/498

(58) Field of Classification Search
USPC ........ 271/264, 272, 275; 250/59.06–559.085; 399/206, 215; 358/498
See application file for complete search history.

(56) References Cited

U.S. PATENT DOCUMENTS

| | | | |
|---|---|---|---|
| 4,316,667 A | 2/1982 | Edwards et al. | |
| 5,339,175 A * | 8/1994 | Omata et al. | 358/498 |
| 5,732,148 A * | 3/1998 | Keagy et al. | 382/124 |
| 6,108,106 A | 8/2000 | Hayashi et al. | |
| 6,209,861 B1 | 4/2001 | Kakuta et al. | |
| 6,339,484 B1 * | 1/2002 | Arai | 358/498 |
| 6,431,778 B1 * | 8/2002 | Coudray et al. | 400/635 |
| 6,585,261 B2 * | 7/2003 | Miller et al. | 271/264 |
| 6,964,414 B2 * | 11/2005 | Willis | 271/272 |
| 7,703,767 B2 | 4/2010 | Edwards et al. | |
| 8,152,165 B2 * | 4/2012 | Cha et al. | 271/264 |
| 2003/0030854 A1 | 2/2003 | Huang et al. | |
| 2007/0160399 A1 | 7/2007 | Sheng et al. | |
| 2010/0156038 A1 * | 6/2010 | Edwards et al. | 271/225 |
| 2010/0225983 A1 * | 9/2010 | Fujii et al. | 358/498 |
| 2010/0254734 A1 * | 10/2010 | Ishioka | 399/322 |

OTHER PUBLICATIONS

International Search Report and Written Opinion date mailed Mar. 22, 2013; PCT International Application No. PCT/US2012/069128.

* cited by examiner

*Primary Examiner* — Jeremy R Severson
(74) *Attorney, Agent, or Firm* — Patton Boggs LLP

(57) ABSTRACT

Document guide systems and methods employing a document platen are provided. According to an illustrative embodiment, a document guide system employing a document platen includes a document platen having a first, document-faceable side and a second, opposing side, and a document support sub-system adjacent the first side of the document platen. The document support sub-system and the first side of the document platen are adapted to receive a document therebetween, and the document platen forms an aperture adapted to allow electromagnetic radiation therethrough.

26 Claims, 16 Drawing Sheets

DOCUMENT GUIDE SYSTEMS AND METHODS EMPLOYING A DOCUMENT PLATEN

TECHNICAL FIELD

The illustrative embodiments relate generally to document guide systems, and more particularly, to document guide systems and methods employing a document platen.

BACKGROUND

Documents, such as banknotes (e.g., paper money, plastic money, etc.), checks, legal-related documents, or any other type of document, may need to be processed or analyzed for a wide variety of purposes. Guide systems may be employed to guide or position a document while it is being processed or analyzed. Such guide systems may be used in conjunction with machines that move documents through a series of processing steps using, e.g., belts, rings, rollers, or other means of moving a document. However, currently available document guide systems may fail to properly position or flatten a document, thus decreasing the effectiveness of its processing or analysis capabilities. For example, current document guide systems may fail to properly flatten or straighten a document against a surface to minimize folds, wrinkles, or waviness that may adversely affect document processing or analysis. Also, the shape or size of some current document guide systems may be inappropriate for placement in certain locations within a document processing machine, thus limiting the ability of those current systems from being employed in current document processing machines. Indeed, these and other issues have limited the effectiveness of some current document guide systems.

SUMMARY

According to an illustrative embodiment, a document guide system employing a document platen includes a document platen having a first, document-faceable side and a second, opposing side, and a document support sub-system adjacent the first side of the document platen. The document support sub-system and the first side of the document platen are adapted to receive a document therebetween, and the document platen forms an aperture adapted to allow electromagnetic radiation therethrough.

According to another illustrative embodiment, a document guide system employing a document platen includes a document platen having a first, document-faceable side and a second, opposing side. The document platen has an entry portion and an exit portion. The document platen further includes a first roller at least partially within the entry portion of the document platen, and a second roller at least partially within the exit portion of the document platen. The document guide system includes a document support sub-system adjacent the first side of the document platen. The document support sub-system and the first side of the document platen are adapted to receive a document therebetween. The document has a direction of travel from the entry portion to the exit portion of the document platen. The document platen forms an aperture adapted to allow electromagnetic radiation therethrough, and the first roller and the second roller are rotatable to facilitate movement of the document in the document direction of travel.

According to another illustrative embodiment, a document guide system employing a document platen includes a document platen having a first, document-faceable side and a second, opposing side. The document platen has an entry edge and an exit edge. The document guide system includes a document support subsystem adjacent the first side of the document platen. The document support sub-system and the first side of the document platen are positioned to allow a document to pass between the document support sub-system and the first side of document platen. The document platen forms an aperture located at approximately a midpoint between the entry edge and the exit edge. The document guide system includes one or more electromagnetic radiation sources aimed at the aperture of the document platen to illuminate at least a portion of the document at the aperture of the document platen, and an imaging device aimed at the aperture of the document platen to capture an image of at least a portion of the document at the aperture of the document platen. The imaging device is positioned on an opposite side of the document platen than the document support sub-system. The imaging device has a line of sight substantially perpendicular to the first side of the document platen.

DETAILED DESCRIPTION

In the following detailed description of the illustrative embodiments, reference is made to the accompanying drawings that form a part hereof. These embodiments are described in sufficient detail to enable those skilled, in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in limiting sense, and the scope of the illustrative embodiments are defined only by the appended claims.

Figure 1A:
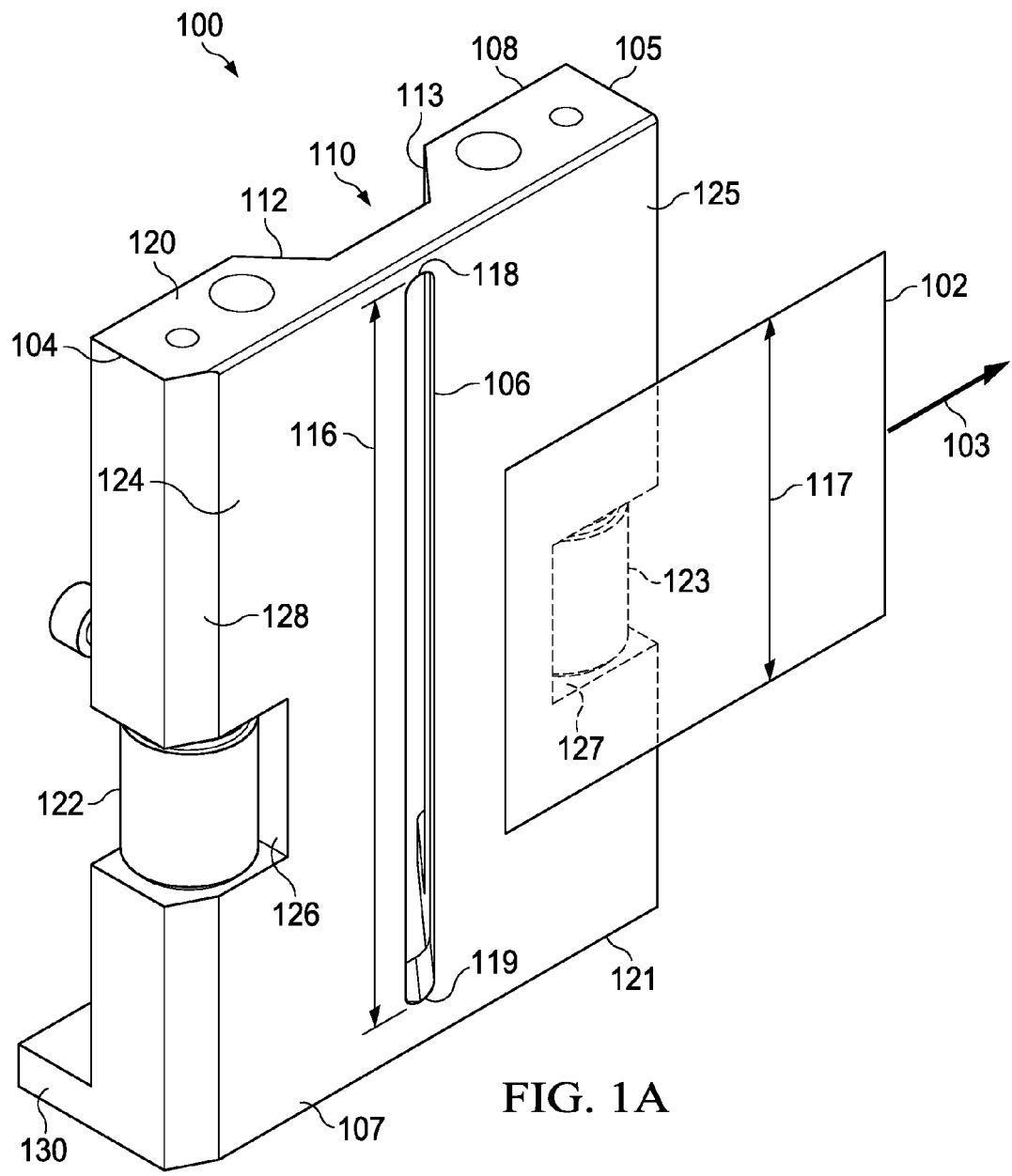
FIG. 1A is a schematic, perspective view of the document-faceable side of a document platen according to an illustrative embodiment.
Figure 1B:
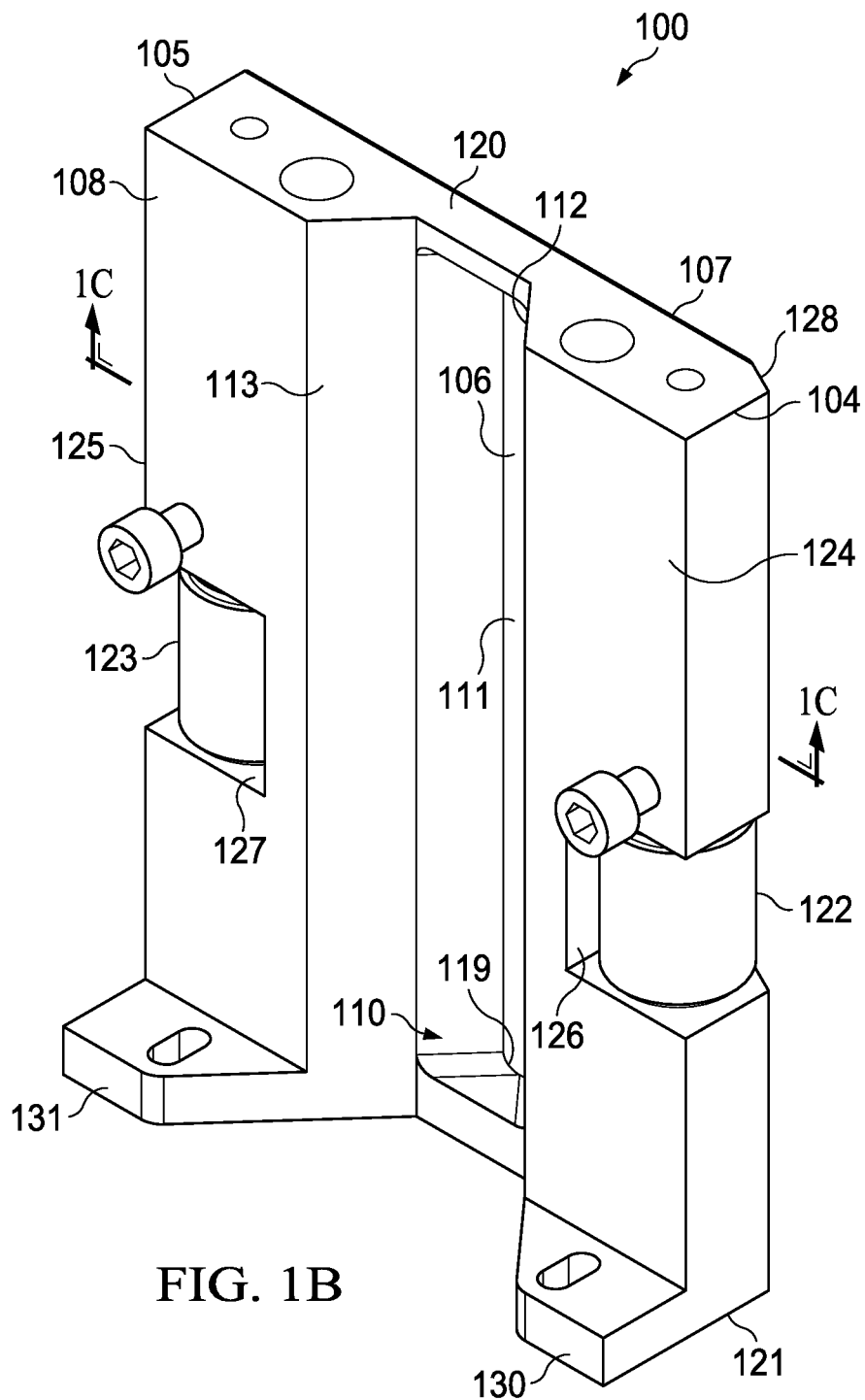
FIG. 1B is a schematic, perspective view of the opposite side of the document platen shown in FIG. 1A.
Figure 1C:
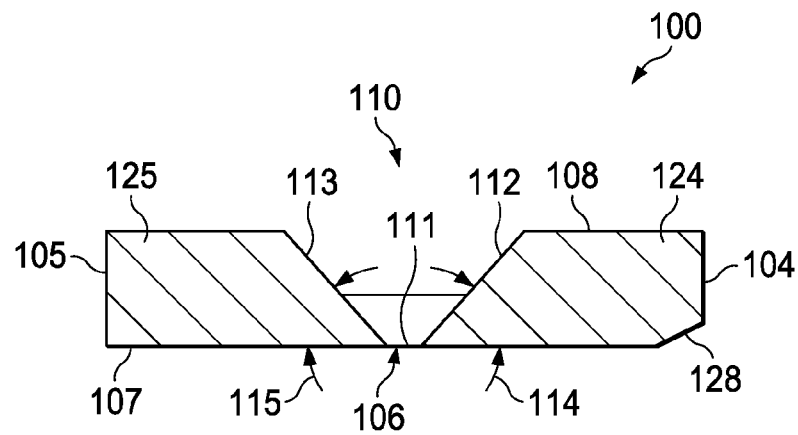
FIG. 1C is a schematic, cross-sectional view of the document platen in FIG. 1B taken along line 1C-1C.

Referring to FIGS. 1A, 1B, and 1C, an illustrative embodiment of a document platen 100, against which a document 102 may be held or moved, is shown. The document 102 may be any type of document on which processing or analysis may be performed, including, but not limited to, banknotes from any country of origin, financial documents (e.g., checks, money orders, travelers checks, etc.), legal related documents, etc. Unless otherwise indicated, as used herein, "or" does not require mutual exclusivity. The document 102 may also be formed from any material, including paper, plastic, synthetic materials, etc.

The document 102 has a direction of travel 103 from an entry edge 104 to an exit edge 105 of the document platen 100. As the document 102 moves past an aperture 106 formed by the document platen 100, the document 102 may be analyzed or processed in any manner, including using the systems described herein. The document 102 may move across a first, document-faceable side 107 of the document platen 100. The document 102 may be held or moved across the first side 107 of the document platen 100 using a document support sub-system, which is not shown in FIGS. 1A-C, but is shown and described in more detail below. The document 102 may move between the first side 107 of the document platen 100 and the document support sub-system (not shown) as the document 102 moves in its direction of travel 103.

In one embodiment, the first side 107 of the document platen 100 may be a substantially flat surface against which the document 102 may be held or moved. However, the first side 107 of the document platen 102 is not limited to flat surfaces only, as the first side 107 may form a curve or arc that is either concave or convex, depending on the embodiment. Other shapes of the first side 107 of the document platen 100 are also possible in the embodiments.

The document platen 100 also has a second side 108 that opposes the first, document-faceable side 107. In one embodiment, the second side 108 of the document platen 100 may form an indent 110. The aperture 106 may be located at approximately the apex 111 of the indent 110. In one embodiment, the indent 110 may also have angled sides 112, 113. The angled sides 112, 113 of the indent 110 may form angles 114, 115 with the first side 107 of the document platen 100, respectively. In one embodiment, each of the first angle 114 and the second angle 115 may be in a range from 5° to 85° (e.g., 15°, 30°, 45°, 60°, 70°, etc.). While the first, and second angles 114, 115 are shown as being substantially the same as one another in FIGS. 1A-C, the first angle 114 may differ from the second angle 115, in one embodiment. In yet another embodiment, either or both of the first and second angles 114, 115 may be 90°, or approximate thereto, in which case the indent 110 has straight, as opposed to angled, sides. As will be discussed in more detail below, the angled sides 112, 113 of the indent 110 may allow lines of sight from various components (e.g., camera, electromagnetic radiation sources, etc.) aimed at the aperture 106 from multiple or various angles or positions. In another embodiment, the document platen 100 may not have the indent 110, either on the first or second side 107, 108 of the document platen 100; in this embodiment, the second side 108 of the document platen 100 may be substantially flat or curved. In yet another embodiment, the aperture 106 may be located anywhere within the indent 110, including locations other than the apex 111. Indeed, the aperture 106 may also be present if the document platen 100 does not have an indent 110.

The aperture 106 formed by the document platen 100 may be any space, hole, or gap that allows electromagnetic radiation therethrough, or allows a line of sight to a passing document 102. The aperture 106 may be located at approximately a midpoint between the entry edge 104 and the exit edge 105 of the document platen 100. The aperture 106 may be an elongated slit, as shown in FIGS. 1A-C. The elongated slit may be substantially perpendicular to the direction of travel 103 of the document 102. While the aperture 106 is shown to be an elongated slit, the aperture 106 may have any share (e.g., circle, oval, polygonal, irregular, adjustable, etc.), and may also be elongated along different, directions (e.g., parallel with document direction of travel 103, diagonally, etc.) than that shown in FIGS. 1A-C. The elongated slit may have a top end 118 that is adjacent or near the top side 120 of the document platen 100 and a bottom end 119 that is adjacent or near the bottom side 121 of the document platen 100. In some illustrative embodiments, as will be described in more detail below, the aperture 106 may allow a electromagnetic radiation source to transmit electromagnetic radiation to or through the document 102, and may also allow an imaging device (e.g., camera) to capture one or more images of the document 102 as it passes by the aperture 106. The length 116 of the aperture 106 may also meet or exceed the height 117 of the document 102; as a result, the entire height of the document 102 may be processed or analyzed using the aperture 106, according to one embodiment. In yet another embodiment, the length 116 of the aperture 106 may be less than the height 117 of the document 102.

The document platen 100 may also include a first roller 122 and a second roller 123 that are rotatable to facilitate movement of the document 102 in its direction of travel 103. Regarding location of the rollers 122, 123, if the document platen 100 is considered to have an entry portion 124 and an exit portion 125 such that the document 102 has a direction of travel 103 from the entry portion 124 toward the exit portion 125, the first roller 122 may be at, within, or at least partially within the first portion 124 of the document platen 100. The second roller 123 may be located at, within, or at least partially within the exit portion 125 of the document platen 100. The roller 122 may be located substantially within a cutout portion 126 of the entry portion 124 of the document platen 100, and the second roller 123 may be located substantially within a cutout portion 127 of the exit portion 125 of the document platen 100. While the first and second rollers 122, 123 are shown to be substantially located and rotatable within their respective portions 124, 125 of the document platen 100, the rollers 122, 123 are not limited to being embedded within the structure of the document platen 100 and may protrude therefrom more than is shown in FIGS. 1A-C. Also, the first and second rollers 122, 123 may be substantially cylindrical and rotate in the direction of travel 103 of the document 102. The rollers 122, 123 may be located anywhere that permits contact with the document 102 such that they may facilitate movement of the document 102 in the direction of travel 103.

Though the rollers 122, 123 may be freely rotatable, without the use of a motivating force, to facilitate movement of the document 102 in its direction of travel 103, the rollers 122, 123 may also be subjected to a motivating force that rotates the rollers 122, 123 such that they move the document 102 in its direction of travel 103. Rotation of the rollers 122, 123 may be accomplished using any motivating means, such as a motor, or, as shown below, one or more belts.

While the document platen 100 is shown to have two rollers 122, 123, the document platen 100 may have any number of rollers to facilitate movement of the document 102, and these rollers may be placed at various positions on the document platen 100. For example, the document platen 100 may have one or more rollers located only on either the entry portion 124 or the exit portion 125 of the document platen 100. In yet another embodiment, the document platen 100 may have no rollers at all.

The entry portion 124 of the document platen 100 may also have a tapered entry edge 128 that guides the document 102 into a space between the first side 107 of the document platen 100 and the document support sub-system (not shown in FIGS. 1A-C, but shown below). The tapered entry edge 128 may help to ensure that the document 102 is properly positioned and moved along the first side 107 of the document platen 100, and help to prevent document jamming. The angle or degree of the taper of the tapered entry edge 128 may vary.

The document platen 100 may be formed from any material, including, but not limited to, metal, plastic, synthetic material, rubber, etc. In one non-limiting example, the document platen 100 may be formed from aluminum 6061-T6 or other equivalent material. Indeed, any of the parts or elements described herein may be formed from the aforementioned materials, including aluminum 6061-T6 or other equivalent material. In one illustrative embodiment, the document platen 100 may also have a finish or coating. For example, the first side 107 of the document platen 100, the second side 108 of the document platen 100, the apex 111, angled sides 112, 113, or any other portion of the indent 110, the edges of the aperture 106, the side(s) of the document platen 100, or any other portion of the document platen 100 may be coated or covered with a finish or coating. Non-limiting examples of the finish or coating include black anodized or any other non-reflective material (e.g., paint, adhesive material, or any other substance that will not reflect electromagnetic radiation or light). In yet another embodiment, the coating or finish may be a reflective material. The document platen 100 may be anchored to a surface in any manner, including by the use of one or more anchor tabs 130, 131.

Figure 2:
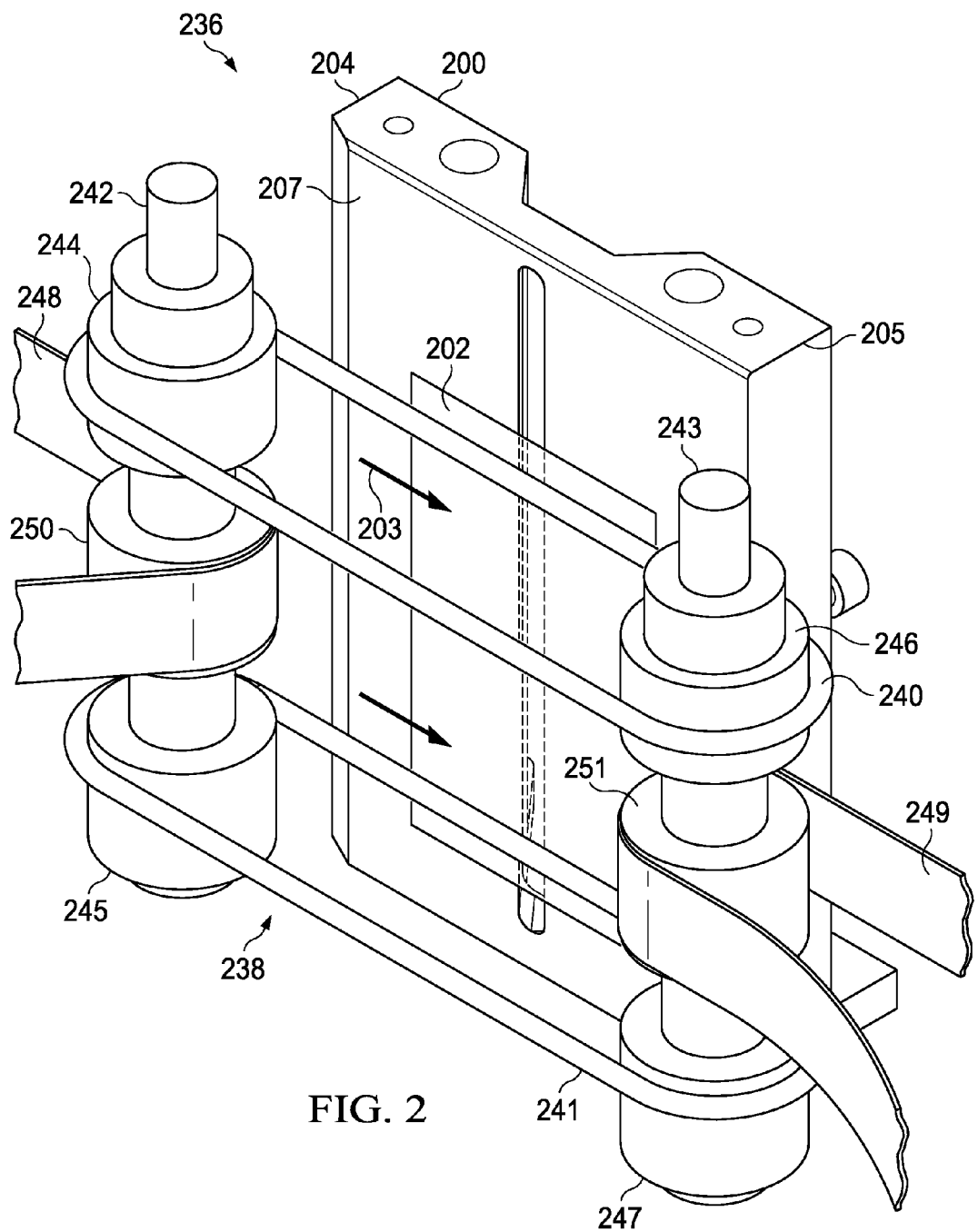
FIG. 2 is a schematic, perspective view of a document guide system including a document platen with a document support sub-system having an upper band and a lower band according to an illustrative embodiment.

Referring to FIG. 2, an illustrative embodiment of a document guide system 236 includes the document platen 200, a document support sub-system 233, and a document 202 traveling therebetween in its direction of travel 203. Elements of FIG. 2 that are analogous to elements in FIGS. 1A-C have been shown by indexing the reference numerals by 100. The document support sub-system 238 includes an upper band 240 and a lower band 241 that hold the document 202 against the first side 207 of the document platen 200 when the document 202 moves along the first side 207 of the document platen 200 and between the bands 240, 241 and the first side 207 of the document platen 200.

The upper and lower bands 240, 241 are supported by a first post 242, located adjacent the entry edge 204 of the document platen 200, and a second post 243, located adjacent the exit edge 205 of the document platen 200. It is noted that, in this embodiment, the document 202 has a direction of travel 203 from the entry edge 204 to the exit edge 205. The first post 242 may have an upper portion 244 and a lower portion 245. Likewise, the second post 243 may have an upper portion 246 and a lower portion 247. The upper and lower portions 244, 245, 246, 247 of the first and second posts 242, 243 may be enlarged, or have a greater diameter or circumference, as compared to other portions of the posts 242, 243. However, it will be appreciated that the upper and lower portions 244, 245, 246, 247 need not be enlarged as shown in FIG. 2.

The upper band 240 is wrapped partially around the upper portion 244 of the first post 242 and partially around the upper portion 246 of the second post 243 so as to be elongated, or stretched, from the first post 242 to the second post 243. The lower band 241 is wrapped partially around the lower portion 245 of the first post 242 and partially around the lower portion 24 of second post 243 so as to be elongated, or stretched, from the first post 242 to the second post 243. The upper and lower bands 240, 241 are also adjacent the first side 207 of the document platen 200 so as to at least partially press the document 202 against the first side 207 of the document platen 200 when the document 202 passes between the first side 207 of the document platen 200 and the bands 240, 241.

As seen in FIG. 2, the upper and lower bands 240, 241 are spaced from one another such that they make contact with upper and lower portions of the document 202. However, the spacing may be varied depending on the embodiment. The upper and lower bands 240, 241 may be made from any material, such as plastic, rubber, synthetic materials, etc. In one embodiment, each of the upper and lower bands 240, 241 are O-rings that are stretched so as to wrap around the first and second posts 242, 243 as shown in FIG. 2. Also, although two bands are shown in FIG. 2, the document guide system 236 may include any number of bands (e.g., 1, 2, 3, 5, 10, etc.).

The first and second post 242, 243 may be rotatable to cause rotation of the upper and lower bands 240, 241, thus facilitating movement of the document 202 in its direction of travel 203. Either or both of the first and second posts 242, 243 may be motivated to rotate using, for example, a motor or belts, so that the upper and lower bands 240, 241 impart force or motion upon the document 202 in its direction of travel 203. In one embodiment, belts 243, 249 may partially wrap around middle portions 250, 251 of the first and second posts 242, 243, respectively. When the belts 248, 249 are put into motion, they may rotate the first and second posts 242, 243 in a clockwise direction (from the perspective shown in FIG. 2), thereby imparting motion upon the upper and lower bands 240, 241, and ultimately the document 202 in its direction of travel 203. The middle portions 250, 251 of the first and second posts 242, 243, respectively, may also be enlarged in a similar fashion as the upper and lower portions 244, 245, 246, 247 of the first and second posts 242, 243. In another embodiment, either or both of the first and second posts 242, 243 may be motivated to rotate in a more direct fashion using one or more motors (without the use of an intervening belt). In yet another embodiment, the first and second posts 242, 243 may not be motivated to rotate at all, and may either freely rotate or be stationary; in this embodiment, the upper and lower bands 240, 241 may still serve the function of holding the document 202 against first side 207 of the document platen 200.

Figure 3:
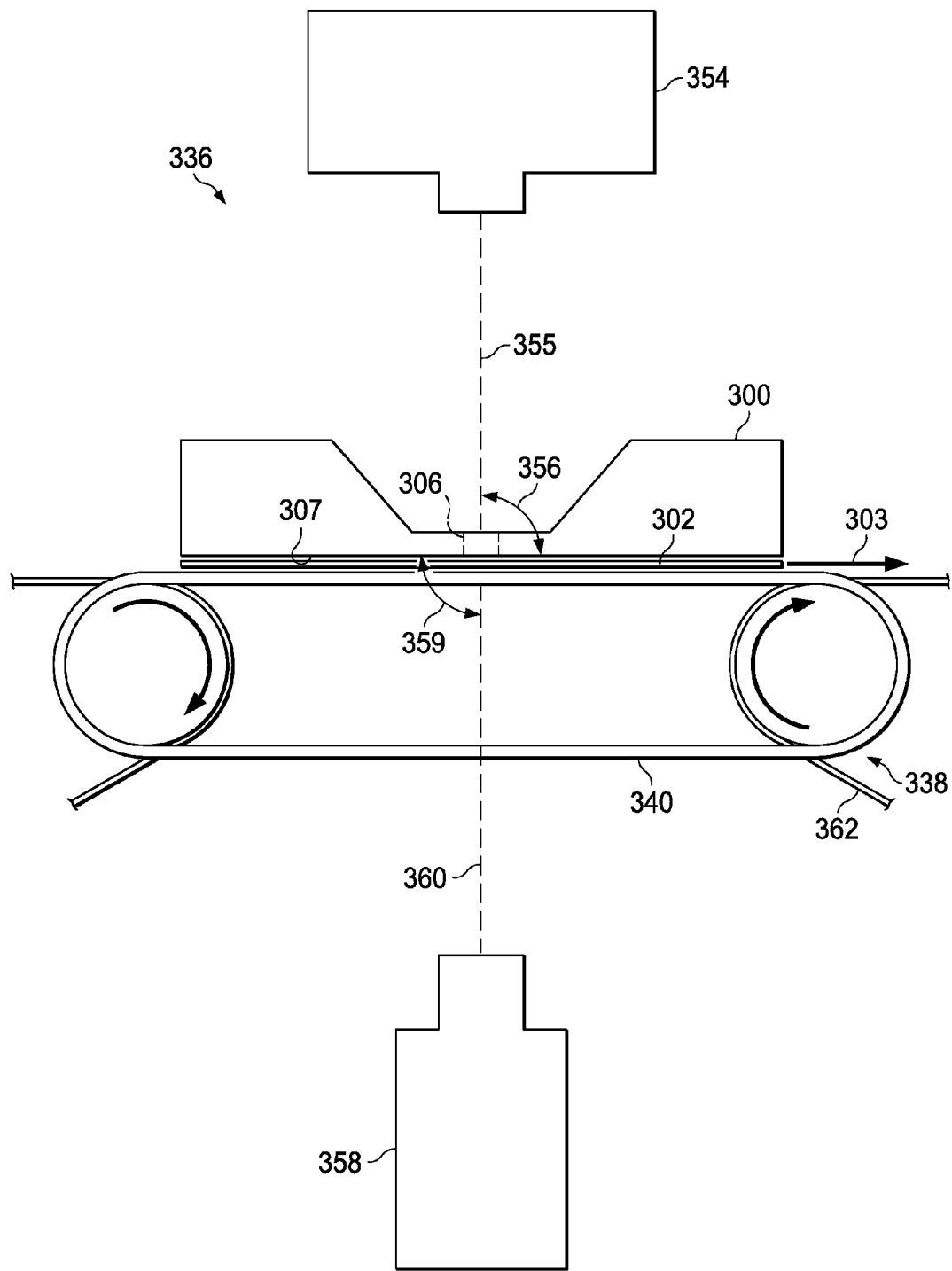
FIG. 3 is a schematic, plan view of a document guide system using transmissive illumination, and a document support sub-system having one or more bands, to capture one or more images of a document according to an illustrative embodiment.
Figure 4A:
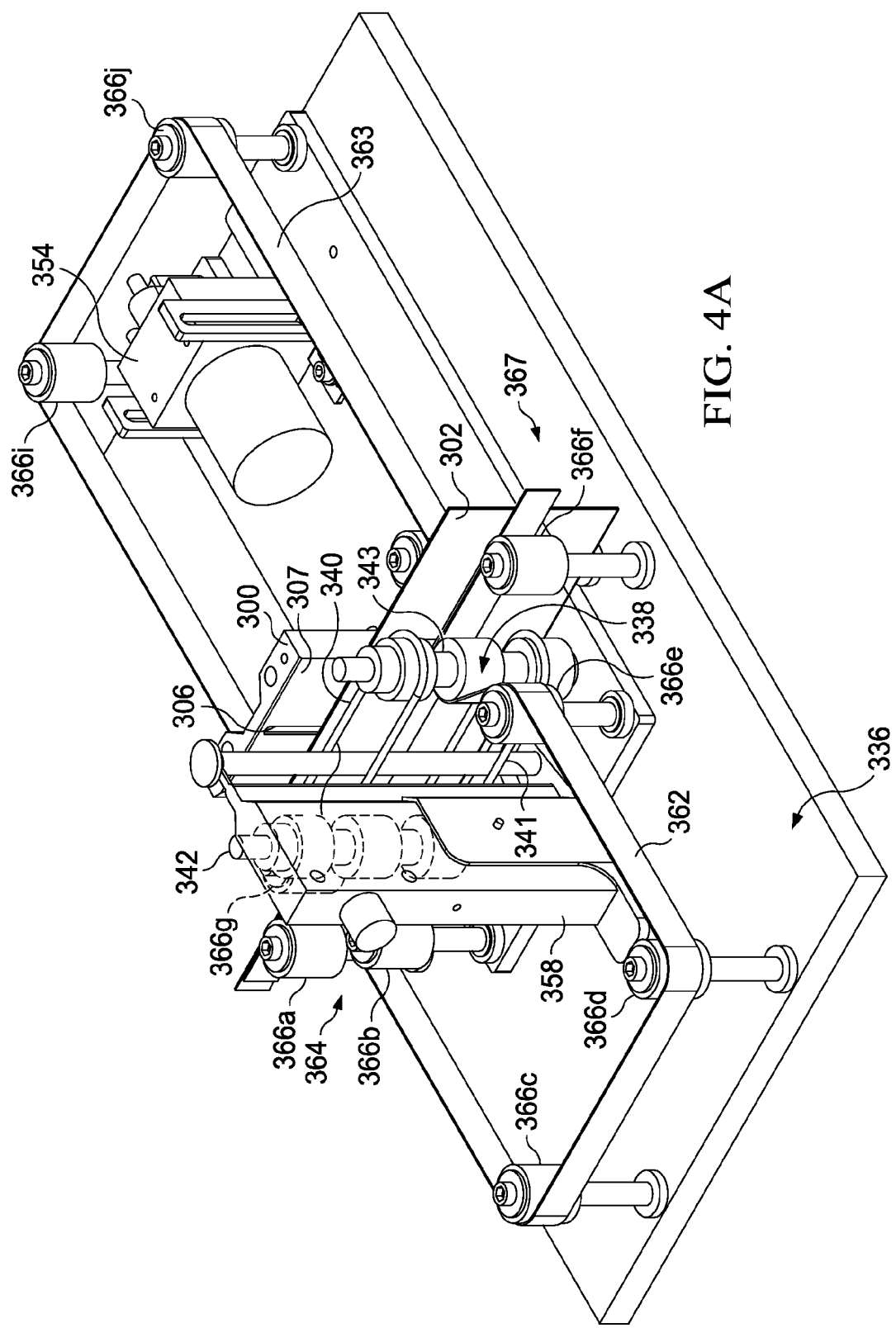
FIG. 4A is a schematic, perspective view of a document guide system using transmissive illumination to capture one or more images of the document, including several belts and rollers to motivate various components in the document guide system, according to an illustrative embodiment.
Figure 4B:
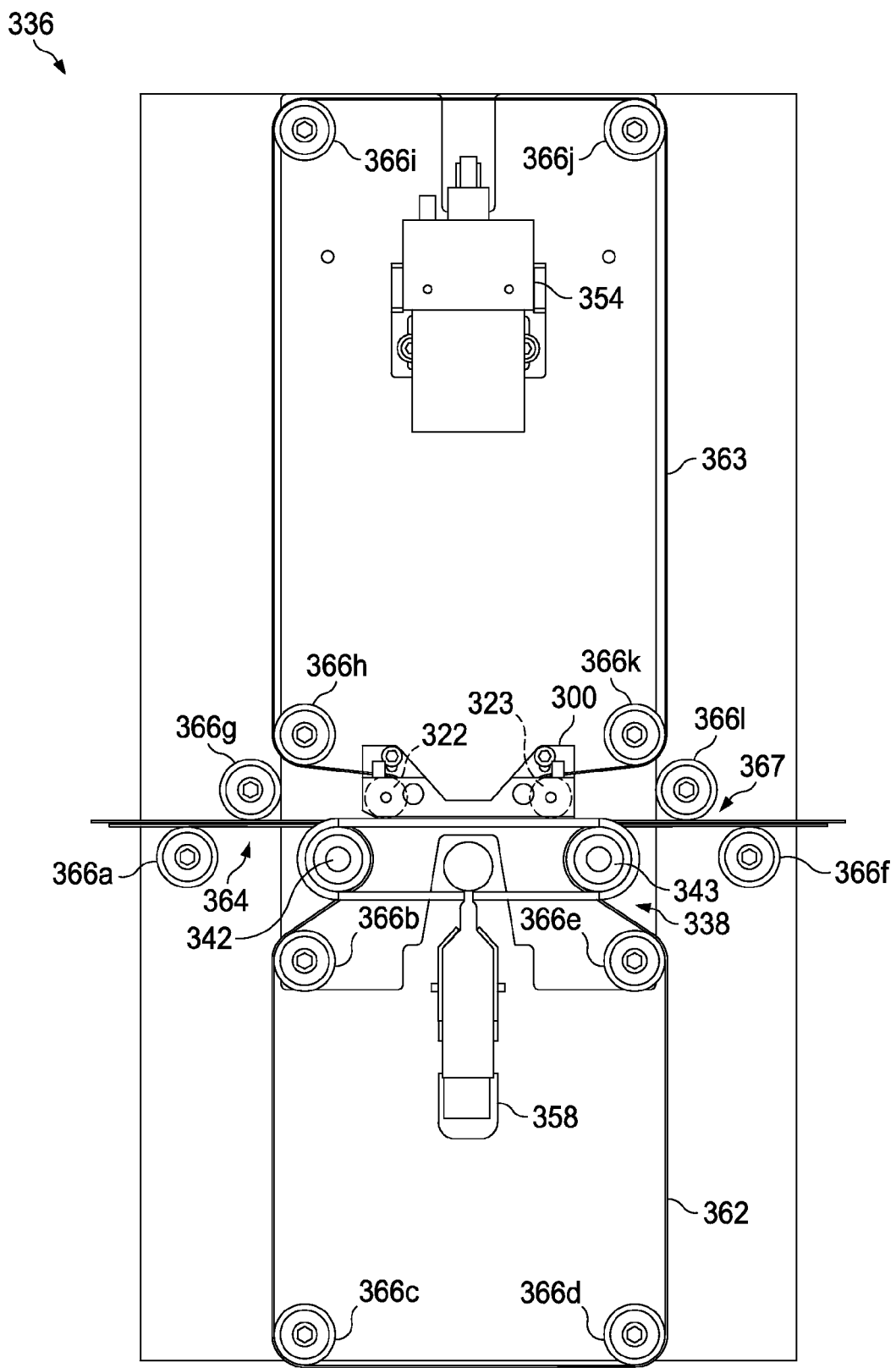
FIG. 4B is a schematic, plan view of the document guide system in FIG. 4A.

Referring to FIGS. 3, 4A, and 4B, an illustrative embodiment of the document guide system 336 includes the document platen 300, the document support sub-system 338, and the document 302 passing between the document support sub-system 338 and the first side 307 of the document platen 300 in the direction of travel 303. Elements of FIGS. 3, 4A, and 4B that are analogous to elements in FIG. 1A-C or 2 have been shown by indexing the reference numerals by a multiple of 100. The document guide system 336 may be used to capture one or more images of the document 302 using illumination that is transmitted through the document 302.

The document guide system 336 includes an imaging device 354 that is positioned on an opposite side of the document platen 300 as the document support sub-system 338. The imaging device 354 is aimed at the aperture 306 of the document platen 300, and has a line of sight 355 that is substantially perpendicular to the first side 307 of the document platen 300, as indicated by angle 356. The imaging device 354 may capture an image of at least a portion of the document 302 at the aperture 306 of the document platen 300 as the document 302 moves in its direction of travel 303.

It will be appreciated that the imaging device 354 may be a frame camera or line scan camera in some of the illustrative embodiments. Furthermore, any suitable imaging device capable of capturing any suitable image (frame, line, or otherwise) of the document 302, or portion thereof, may be employed and remain within the scope of the present disclosure. For example, and without limitation, the imaging device 354 may be a TDI camera, a frame camera, an x-ray imaging device, an infrared camera, etc.

The document guide system 336 also may include an electromagnetic radiation source 358 aimed at the aperture 306 of the document platen 300 so as to form an angle 359 that is approximately 90°. In particular, the electromagnetic radiation source 358 may have a line of sight 360 that forms the angle 359 with the first side 307 of the document platen 300 that is approximately 90°. The electromagnetic radiation source 358 may emit any type of electromagnetic radiation (e.g., ultraviolet, infrared, white, green, blue, x-ray, visible, etc.) or other suitable electromagnetic radiation, including light.

In this particular embodiment, the imaging device 354 is on an opposite side of the document platen 300 as the electromagnetic radiation source 358. Using this configuration, the imaging device 354 may capture one or more images of at least a portion of the document 302 as or near the aperture 306 that is illuminated by transmissive electromagnetic radiation or light from the electromagnetic radiation source 358. In particular, electromagnetic radiation from the electromagnetic radiation source 358 may illuminate and pass through the portion of the document 302 that is in front of the aperture 306, thereby allowing the imaging device 354 to capture an image of that portion of the document 302 using the electromagnetic radiation transmitted through the document 302.

It will, be appreciated that, in the embodiment represented by FIGS. 3, 4A, and 4B, the document 302 is moved in its direction of travel 303 along the first site 307 of the document platen 300 as the imaging device 354 captures one or more images of the document 302 using electromagnetic radiation transmitted from the electromagnetic radiation source 358 and through the document 302. In FIGS. 3, 4A, and 4B, belts 362 and 363 are used in conjunction with multiple rollers to motivate the document 302 through the document guide system 336. In particular, the document 302 arrives at an entry side 364 sandwiched between the belts 362 and 363. The belts 362 and 363, upon arriving at or near the entry side 364 of the document guide system 336, each diverge into separate paths so as to feed the document 302 into a space between the document support sub-system 338 and the first side 307 of the document platen 300. The belt 362 is routed behind the electromagnetic radiation source 358 via roller 366a, the first post 342, rollers 366b-e, the second post 343, and the roller 366f. The belt 363, upon arrival at the entry side 364 of the document guide system 336, is routed behind the imaging device 354 via roller 366g, the first roller 322, the rollers 366h-k, the second roller 323, and the roller 366l.

After the belts 362 and 363 diverge at the entry side 364 of the document guide system 336, the document 302 is fed between the document support sub-system 338 and the first side 307 of the document platen 300. In a manner that may be similar to that described in FIG. 2, the belt 362 may move to rotate both the first and second posts 342 and 343 so as to rotate the upper and lower bands 340, 341, thereby moving the document 302 in its direction of travel 303. The document 302 may be moved across the first side 307 of the document platen 300 and across the aperture 306 as the electromagnetic radiation source 358 transmits electromagnetic radiation through the document 302 and the aperture 306 so that the imaging device 354 may capture one or more images of the document 302, or portions thereof. After the document 302 leaves the space between the document support sub-system 338 and the first side 307 of the document platen 300, the document 302 may again be sandwiched between the belts 362 and 363 at the exit site 367 of the document guide system 336, where the belts 362 and 363 converge once again after being routed through the rollers 366a-l.

It is noted that the belt 363 is weaved, and makes contact with, the first and second rollers 322, 323 in the document platen 300, thereby rotating these rollers 322, 323 to motivate the document 302 in its direction of travel 303. The imaging device 354 and the electromagnetic radiation source 358 may be any distance from the document platen 300, as desired by the needs of the system. Also, the angles 356 and 359 may vary, and thus are not limited to being perpendicular angles. Any number of documents may be fed through the document guide system 336, and these documents may be analyzed or processed as needed using the images captured by the imaging device 354.

While the document platen 300 is shown to have two rollers 322, 323, the document platen 300 may have any number of rollers to facilitate movement of the document 302, and these rollers may be placed at various positions on the document platen 300. For example, the document platen 300 may have one or more rollers located only on either the entry portion or the exit portion of the document platen 300. In yet another embodiment, document platen 300 may have no rollers at all.

Figure 5:
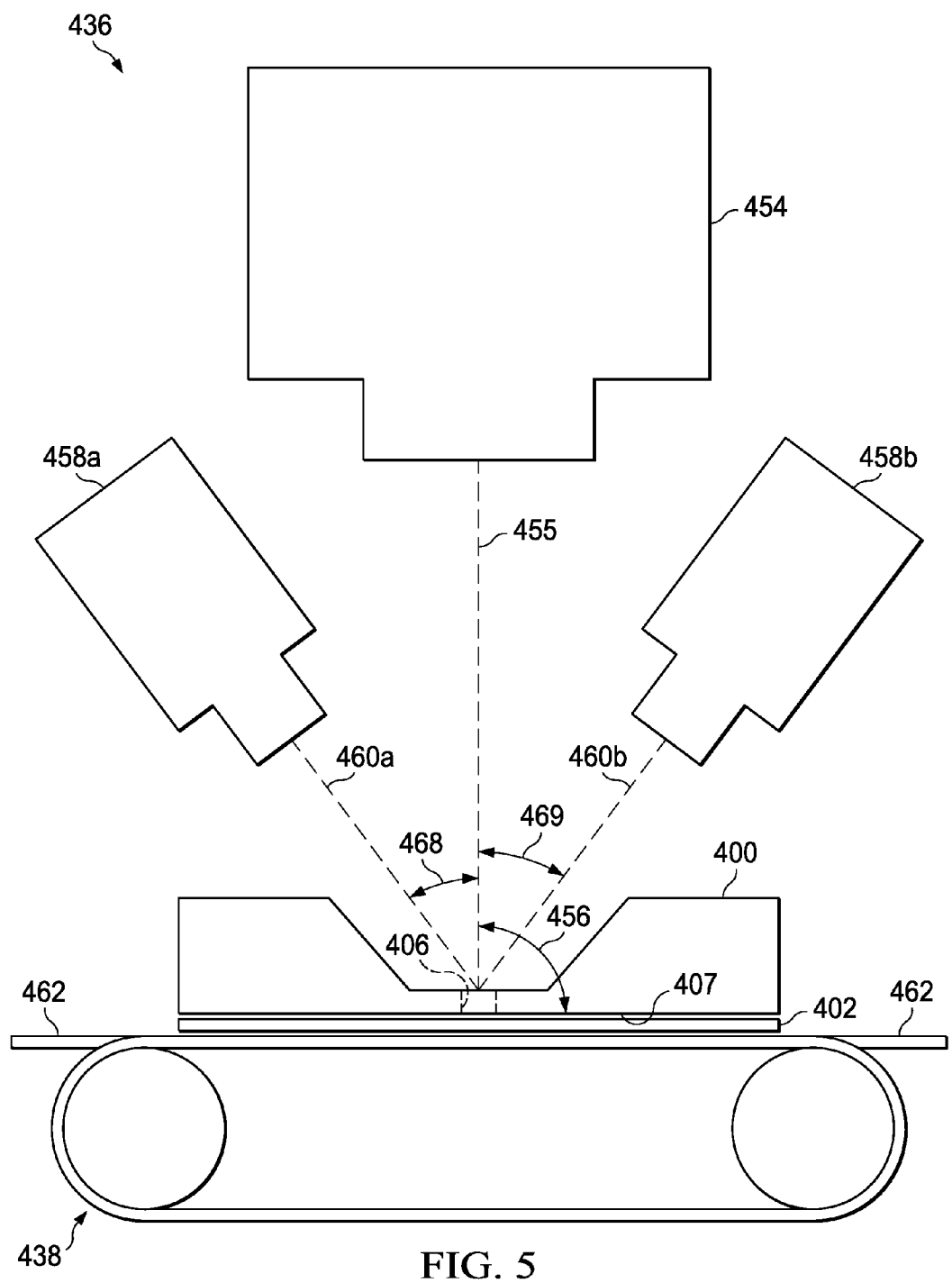
FIG. 5 is a schematic, plan view of a document guide system using reflective illumination to capture one or more images of the document, including one or more bands being used as the document support sub-system, according to an illustrative embodiment.
Figure 6:
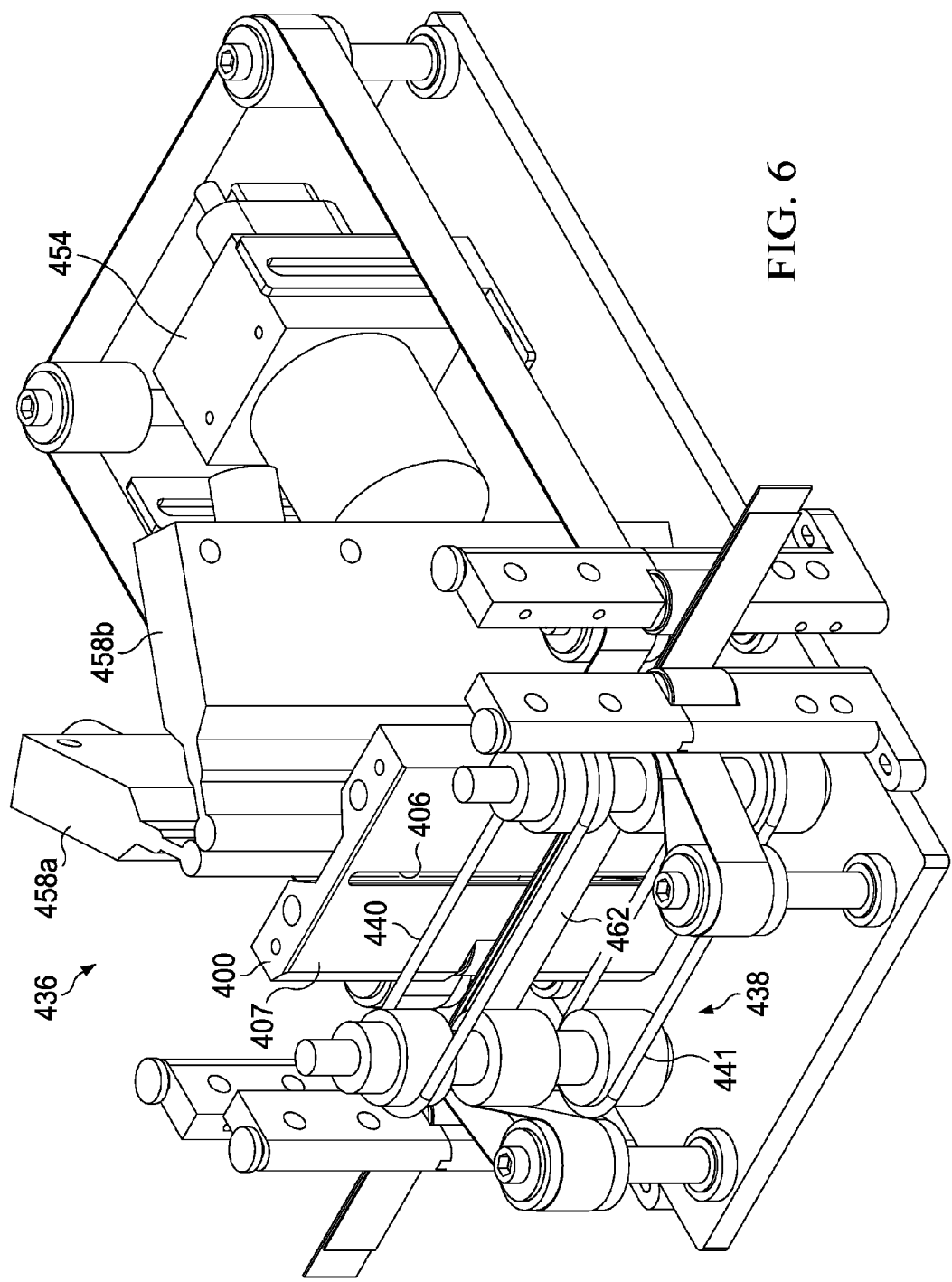
FIG. 6 is a schematic, perspective view of a document guide system using reflective illumination to capture one or more images of a document, including one or more bands being used as the document support sub-system and several belts and rollers to motivate various components in the document guide system, according to an illustrative embodiment.

Referring to FIGS. 5 and 6, an illustrative embodiment of the document guide system 436 includes the imaging device 454 and the electromagnetic radiation sources 458a and 458b on the same side of the document platen 400 as one another. Elements of FIGS. 5 and 6 that are analogous to elements in FIGS. 1A-C, 2, 3, 4A, and 4B have been shown by indexing the reference numerals by multiples of 100. The imaging device 454 and the electromagnetic radiation sources 458a and 458b are also all on the side of the document platen 400 that is opposite than the document support sub-system 438. In contrast to the document guide system 336 in FIGS. 3, 4A, and 4B, the document guide system 436 uses electromagnetic radiation reflected off the surface of the document 402, as opposed to electromagnetic radiation transmitted through the document 402, to capture images of the document 402 using the imaging device 454.

The imaging device 454 has a line of sight 455 that forms an angle 456 with the first side 407 of the document platen 400 that is approximately 90°. The electromagnetic radiation sources 458a and 458b also have respective lines of sight 460a and 460b; these lines of sight 460a and 460b are aimed toward the aperture 406. The line of sight 460a of the electromagnetic radiation source 458a forms an angle 468 with the line of sight 455 of the imaging device 454. The line of sight 460b of the electromagnetic radiation source 458b forms an angle 469 with line of sight 455 of the imaging device 454. The angles 468 and 469 are shown to be approximately the same, although, in other embodiments, they may differ from one another. Also, the angles 468 and 469 may each be an angle greater than 0° and less than 90° (e.g., 10°, 25°, 30°, 45°, 55°, 60°, 75°, etc.). Either or both of the electromagnetic radiation sources 458a and 458b may be activated at any given time in order to illuminate a surface of the document 402 for image capturing by the imaging device 454. The imaging devices 458a and 458b may also emit different types of electromagnetic radiation, including light. In yet another embodiment, the electromagnetic radiation sources 458a and 458b may be sequentially illuminated in order for a line scan camera, which may be the imaging device 454, to capture a composite or interleaved image of the document 402 through the aperture 406.

In contrast to the document guide system 336 in FIGS. 3, 4A, and 4B, the belt 462 moves across the first side 407 of the document platen 400 to hold and move the document 402 across the first side 407 of the document platen 400 so that the document 402 moves across the aperture 406. Thus, in the embodiment of FIGS. 5 and 6, either or both of the belt 462 and the bands 440 and 441 may be used to motivate the document 402 across the first side 407 of the document platen 400 and its direction of travel.

While the document platen 400 is shown to have two rollers therein, the document platen 400 may have any number of rollers to facilitate movement of the document 402, and these rollers may be placed at various positions on the document platen 400. For example, the document platen 400 may have one or more rollers located only on either the entry portion or the exit portion of the document platen 400. In yet another embodiment, the document platen 400 may have no rollers at all.

Figure 7C:
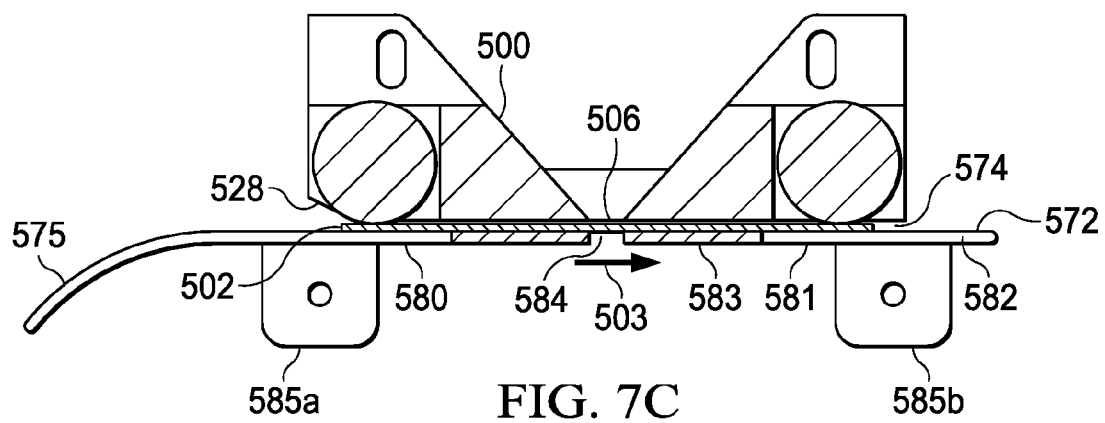
FIG. 7C is a schematic, cross-sectional view of the guide plate and document platen shown in FIG. 7A taken along line 7C-7C.
Figure 7A:
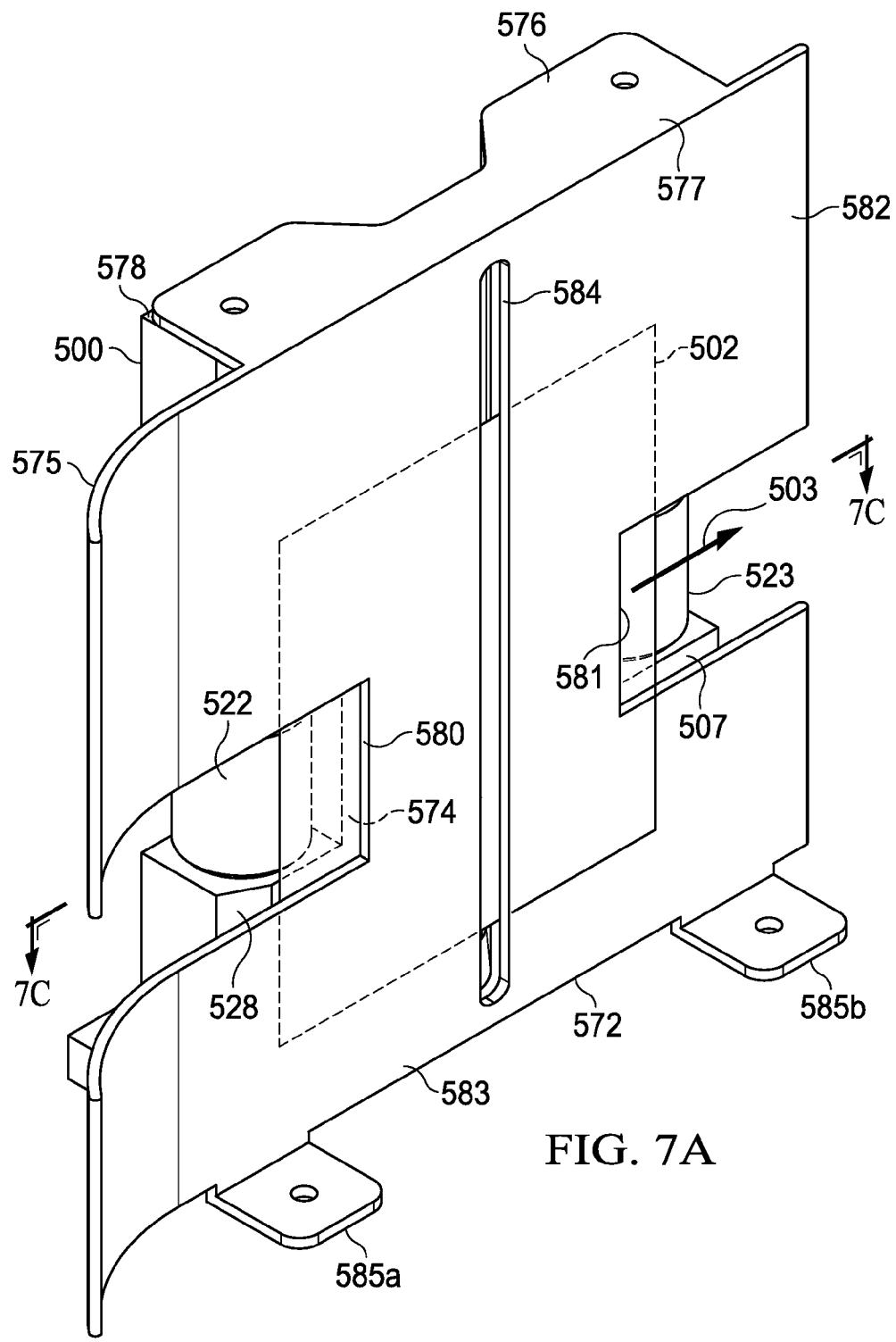
FIG. 7A is a schematic, perspective view of a guide plate coupled to a document platen according to an illustrative embodiment.
Figure 7B:
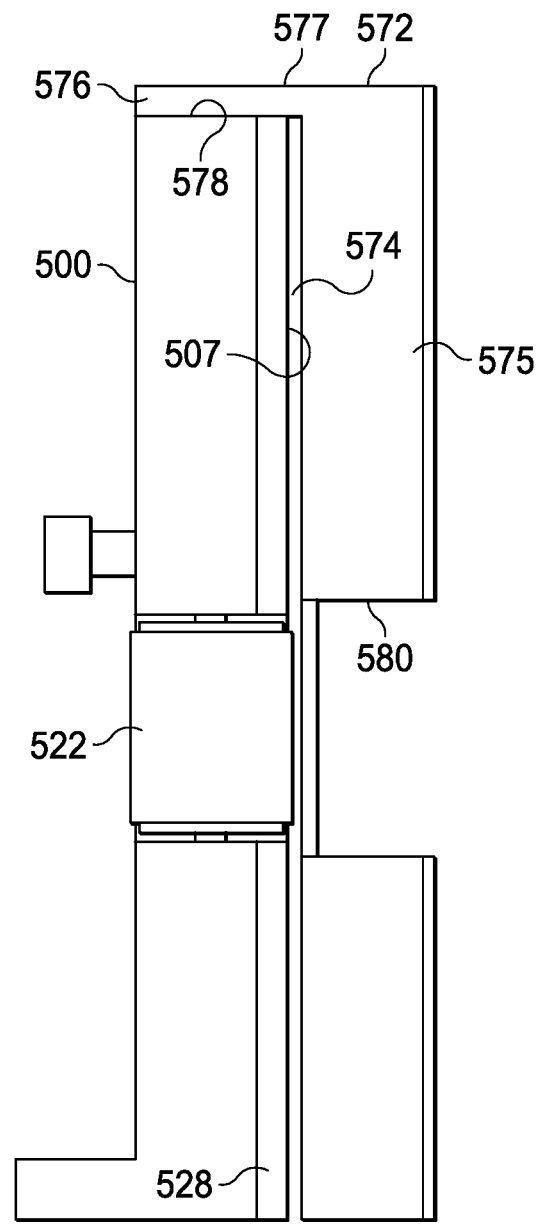
FIG. 7B is a schematic, side view of the guide plate and document platen shown in FIG. 7A.

Referring FIGS. 7A, 7B, and 7C, an illustrative embodiment of a guide plate 572 coupled to the document platen 500 is shown. The guide plate 572 is one non-limiting example of a document support sub-system. Elements of FIGS. 7A, 7B, and 7C that are analogous to elements in FIG. 1 have been shown by indexing the reference numerals by 400. The guide plate 572 is positionable adjacent the first side 507 of the document platen 500 to form a document passage 574 between the guide plate 572 and the first side 507 of the document platen 500. The document 502 may pass through the document passage 574 as the document 502 moves in its direction of travel 503.

To facilitate or guide entry of the document 502 into the document passage 574, the guide plate 572 may have an entry side 575 that curves away from the document platen 500. This curved entry side 575 may provide a tapered transition into the document passage 574, and help prevent the document 502 from being jammed or blocked from entering the document passage 574. Entry of the document 502 into the document passage 574 may be further facilitated by the tapered entry edge 528, which has been described above.

In one embodiment the guide plate 572 is coupled or attached to the document platen 500. For example, the guide plate 572 may include a support lip 576 that protrudes from the top side 577 of the guide plate 572. The support lip 575 may protrude toward the document platen 500 when the guide plate 572 is in position adjacent the first side 507 of the document platen 500, as shown in FIGS. 7A-C. The support lip 576 may be attachable to the top side 578 of the document platen 500 in any manner, including, but not limited to, using bolts, screws, glue, welding, interference fits, etc. While an example is given in which the guide plate 572 is attachable to the top side 578 of the document platen 500, the guide plate 572 may be attached to any portion of the document platen 500 that still allows for a document passage 574. In yet another embodiment, the guide plate 572 may not be attached to the document platen 500 at all while still creating a document passage 574.

As used herein, the term "coupled" may include coupling via a separate object and may also include direct coupling. The term "coupled" may also encompass two or more components that are continuous with one another by virtue of each of the components being formed from the same piece of material. Also, the term "coupled" may include chemical, such as via a chemical bond, mechanical, thermal, magnetic, or electrical coupling.

The guide plate 572 may also include an entry roller cutaway 580 on the entry side 575 of the guide plate 572, as well as an exit roller cutaway 581 on the exit side 582. The entry and exit roller cutaways 580, 581 may each be adapted to receive at least a portion of a roller located on an outer side 583 of the guide plate 572. Although such rollers are not shown in FIG. 7A-C, non-limiting examples of such rollers are shown in FIGS. 8 through 11. The rollers that are at least partially received by the entry and exit roller cutaways 580, 581 may be used to motivate the document 502 through the document passage 574 in the document's direction of travel 503. Such rollers may supplement the motivational, force provided by the first and second rollers 522, 523 that are located in the document platen 500. The entry and exit roller cutaways 580, 581 may be any shape permitting at least partial entry of an object that provides a motivating force to the document 502, and may be located anywhere on the guide plate 572 where such motivating force to the document 502 may be applied.

While the document platen 500 is shown to have two rollers 522, 523, the document platen 500 may have any number of rollers so facilitate movement of the document 502, and these rollers may be placed at various positions on the document platen 500. For example, the document platen 500 may have one or more rollers located only on either the entry portion or the exit portion of the document platen 500. In yet another embodiment, the document platen 500 may have no rollers at all.

The guide plate 572 may also include a guide plate aperture 584 that may allow electromagnetic radiation therethrough or allow an imaging device to take an image of at least a portion of the document 502 within the document passage 574. The guide plate aperture 584 may be substantially coincident with the aperture 506 of the document platen 500. The guide plate aperture 58 may also have a substantially similar shape and orientation as the aperture 506 of the document platen 500. In another embodiment, the guide plate aperture 584 may be offset from the aperture 506 of the document platen 500, or may have a different shape. In yet another embodiment, the guide plate 572 may have no aperture at all.

The guide plate 572 may be formed from any material, including, but not limited to, metal, plastic, synthetics, rubber, etc. In one non-limiting example, the guide plate 572 may be formed from aluminum 6061-T6 or other equivalent material. Indeed, any of the parts or elements described herein may be formed from aforementioned materials, including aluminum 6061-T6 or other equivalent material. In one illustrative embodiment, the guide plate 572 may also have a finish or coating. For example, the outer side 583 or inner side (which forms part of the document passage 574) of the guide plate 572, the curved entry side 575, the exit side 582, the support lip 576, the edges of the guide plate aperture 584, or any other portion of the guide plate 572 may be coated or covered with a finish or coating. Non-limiting examples of the finish or coating include black anodized or any other non-reflective material (e.g., paint, adhesive material, or any other substance that will not reflect electromagnetic radiation or light). In yet another embodiment, the floating or finish may be a reflective material. The guide plate 572 may also be stabilized or mounted using mounting tabs 585a, 585b.

Figure 8:
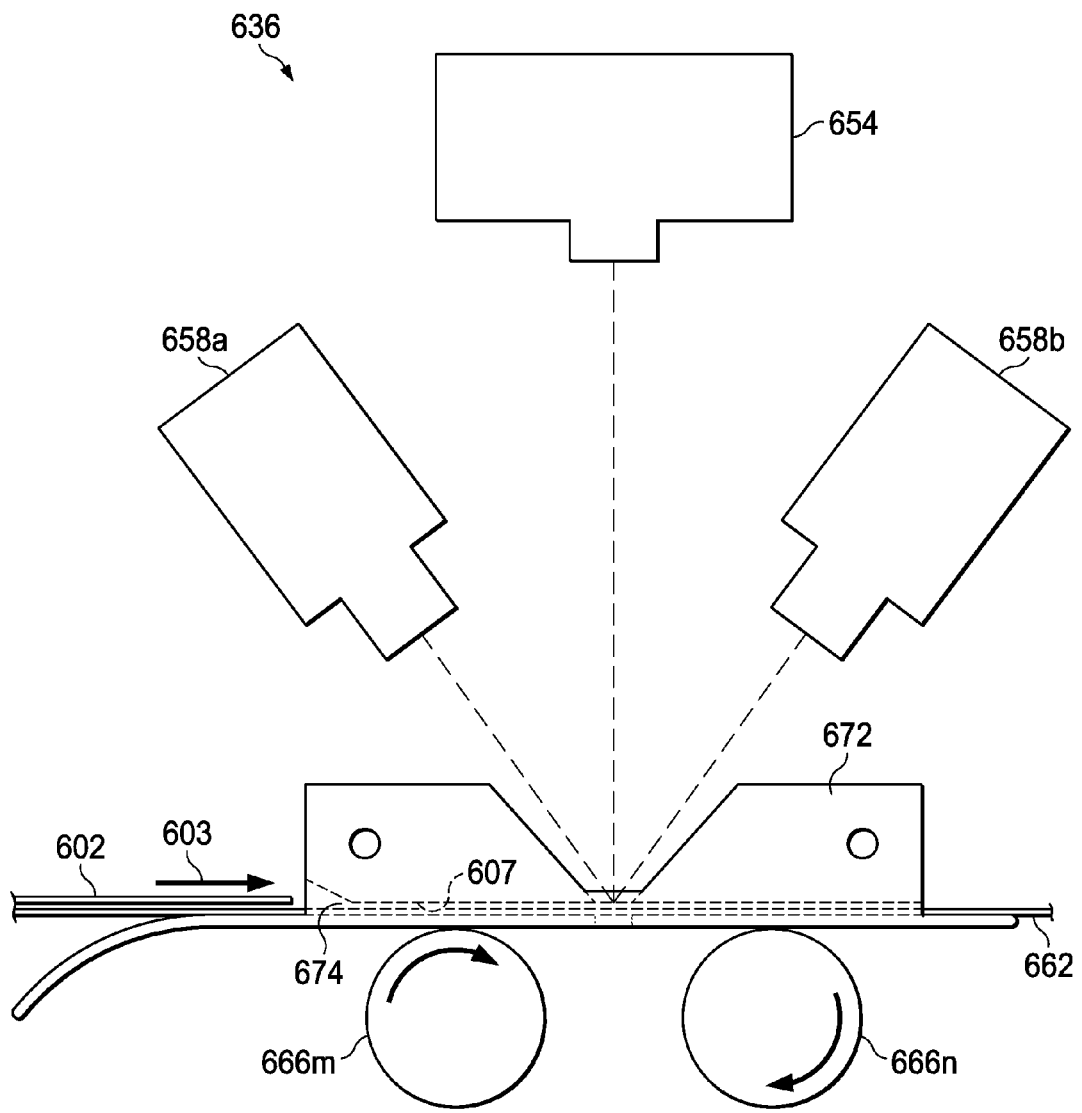
FIG. 8 is a schematic, plan view of a document guide system using reflective illumination to capture one or more images of a document, including a guide plate coupled to a document platen, according to an illustrative embodiment.
Figure 9A:
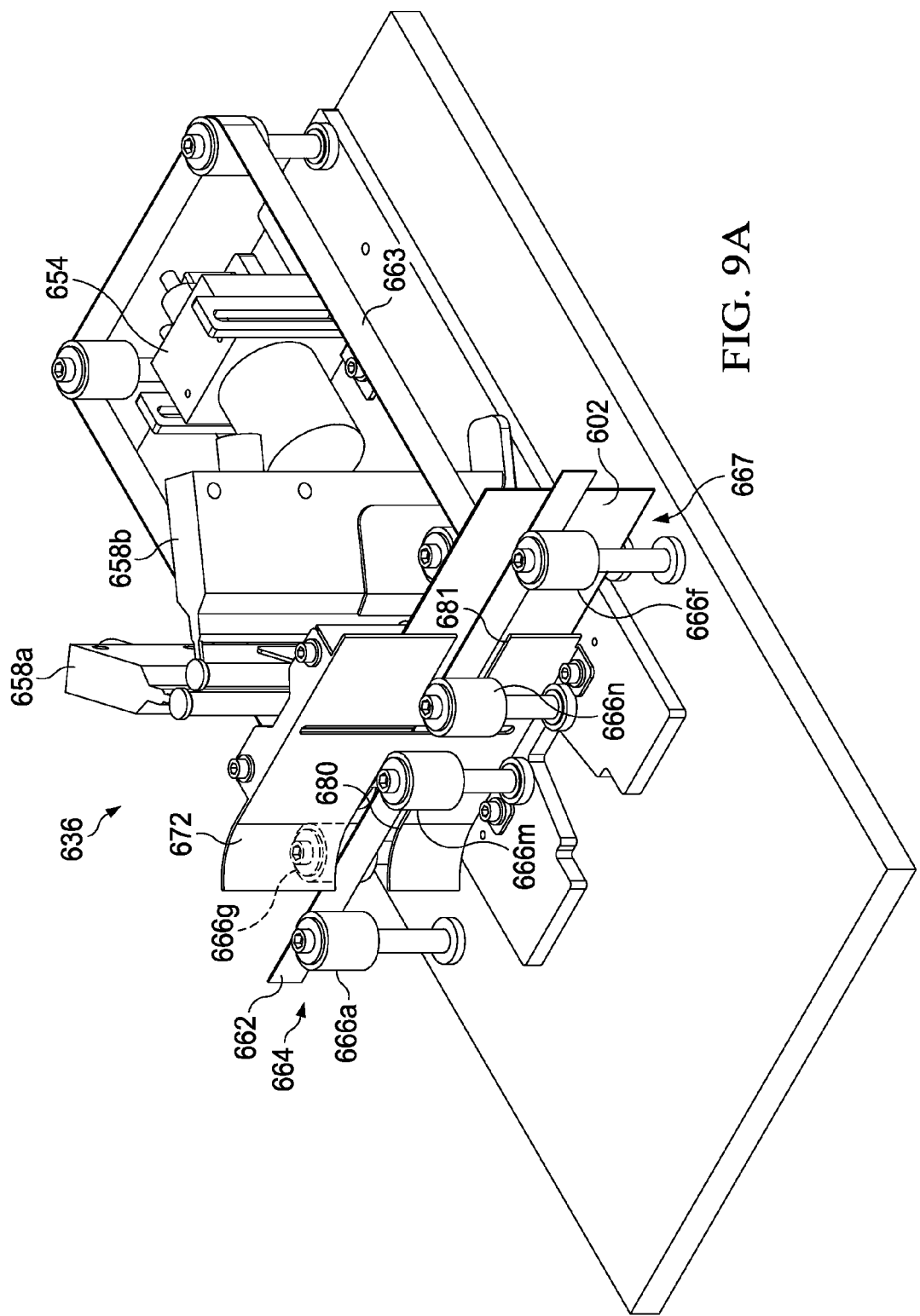
FIG. 9A is a schematic, perspective view of a document guide system using reflective illumination to capture one or more images of a document, including a guide plate coupled to a document platen and several belts and rollers to motivate various components within the document guide system, according to an illustrative embodiment.
Figure 9B:
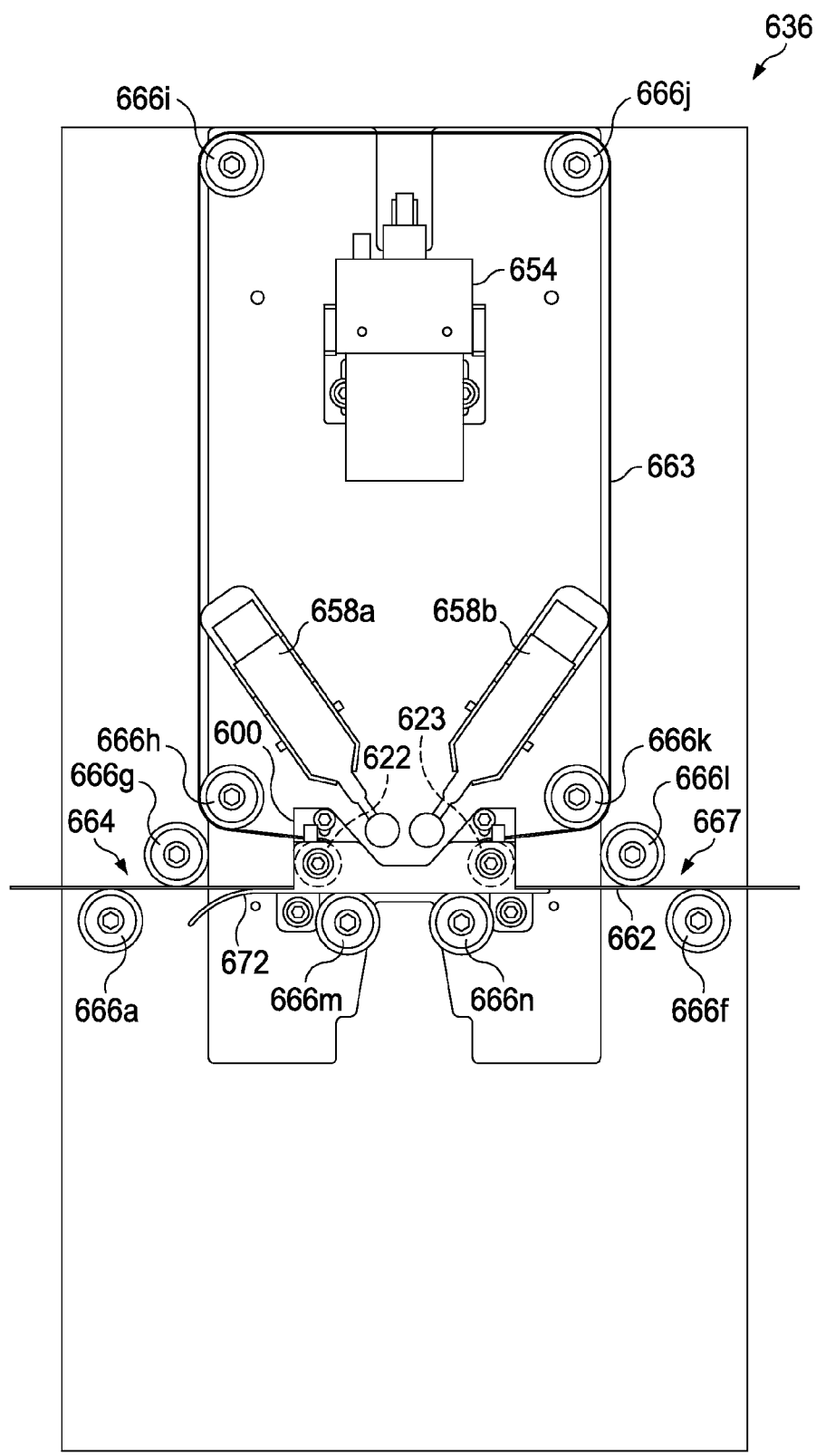
FIG. 9B is a schematic, plan view of the document guide system shown in FIG. 9A.

Referring to FIGS. 8, 9A, and 9B, an illustrative embodiment of the document guide system 636 includes two electromagnetic radiation sources 658a, 658b and the imaging device 654 arranged in a reflective illumination and image capturing system similar to that described in FIGS. 5 and 6. Elements of FIGS. 8, 9A, and 9B that are analogous to elements in FIGS. 1-7 have been shown by indexing the reference numerals by multiples of 100. The imaging device 654 may capture one or more images of at least a portion of the document 602 as it moves in its direction of travel 603 using electromagnetic radiation emitted from either or both of the first and second electromagnetic radiation sources 658a, 658b and reflected off a surface of the document 602. The varying angles, positions, and configurations for the electromagnetic radiation sources 658a, 658b and the imaging device 654 described in FIGS. 5 and 6 may also apply to this embodiment.

As the document 602 approaches the entry side 664 of the document guide system 636, the document 602 may be sandwiched between belts 662 and 663. The belt 663 may diverge behind the electromagnetic radiation sources 658a, 658b and the imaging device 654 is roller 666g, the first roller 622, rollers 666h-k, the second roller 623, and the roller 666l. At the exit side 667 of the document guide system 636, the belt 663 may again converge with the belt 662.

The belt 662 passes through the document passage 674 formed by the guide plate 672 and the document platen 600, which has been described above in FIG. 7A, 7B, 7C. The belt 662 may also be motivated to move in the same direction of travel 603 as the document 602 by the rollers 666a, 666m, 666n, and 666f. As the belt 662 moves through the document passage 674, the belt 662 holds the document 602 against the first side 607 of the document platen 600 while the rollers 666a, 666m, 666n, and 666f move the belt 662 through the document passage 674 to cause the document 602 to move through the document passage 674 in its direction of travel 603.

It is noted that the rollers 666m and 666n are at least partially received by the entry roller cutaway 680 and the exit roller cutaway 681, respectively, thus allowing the rollers 666m and 666n to make contact with the belt 662. In another embodiment, the rollers 666m and 666n may make direct contact with the document 602, instead of via the belt 662, to motivate the document 602 through the document passage 674. It is also noted that the rollers 622 and 623 may be used to motivate the document 602 in its direction of travel 603.

While the document platen 600 is shown to have two rollers 623, the document platen 600 may have, any number of rollers to facilitate movement of the document 602, and these rollers may be placed at various positions on the document platen 600. For example, the document platen 600 may have one or more rollers located only on either the entry portion or the exit portion of the document platen 600. In yet another embodiment, the document platen 600 may have no rollers at all.

It will be appreciated that, although FIGS. 8, 9A, and 9B show the guide plate 672 to have a guide plate aperture, in another embodiment the guide plate 672 may lack the guide plate aperture. For example, the aperture in the guide plate 672 may not be needed due to the utilization of reflective illumination and image capturing on the same side of the document platen 600, as shown in FIGS. 8, 9A, 9B.

Figure 10:
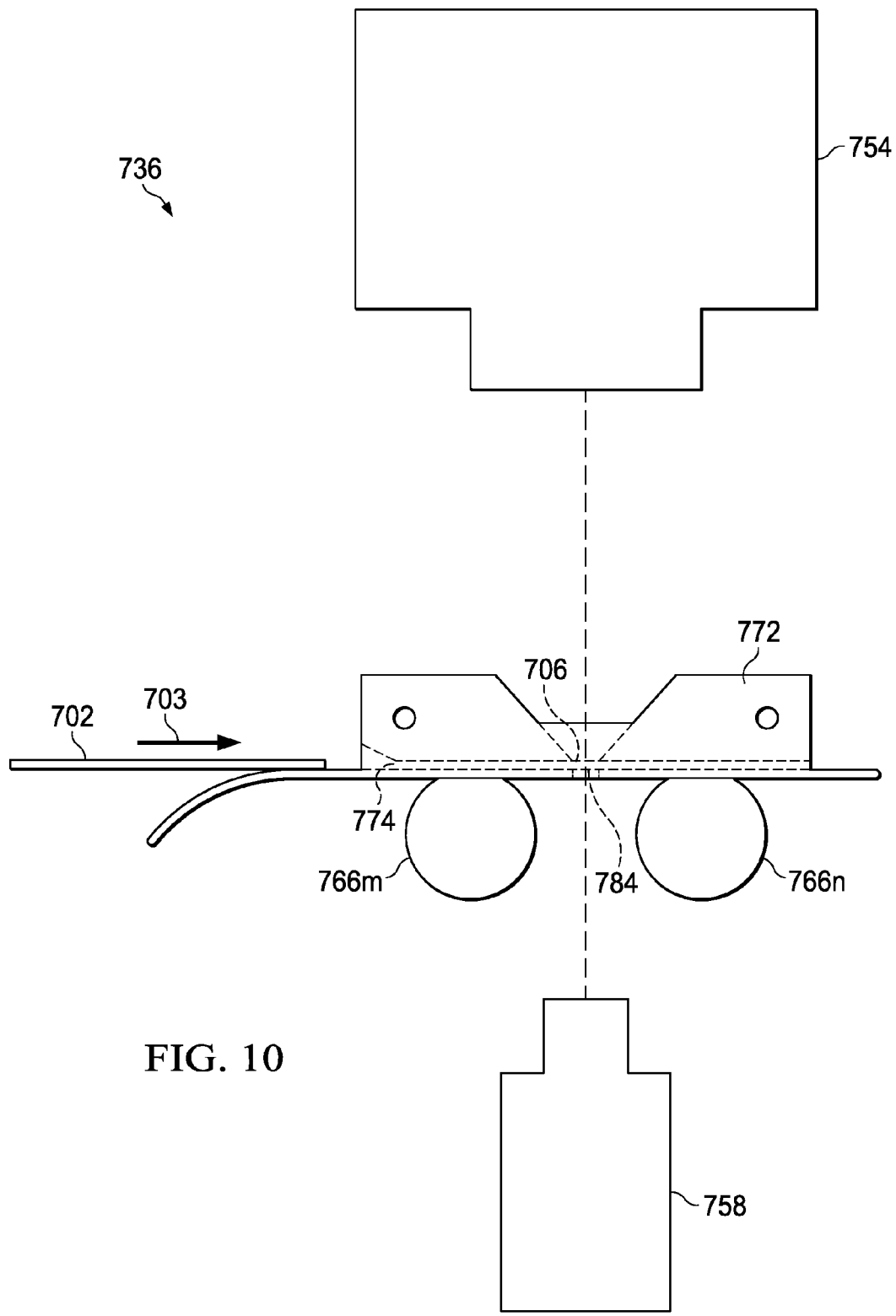
FIG. 10 is a schematic, plan view of a document guide system utilizing transmissive illumination to capture one or more images of a document, including a guide plate coupled to a document platen, according to an illustrative embodiment.
Figure 11:
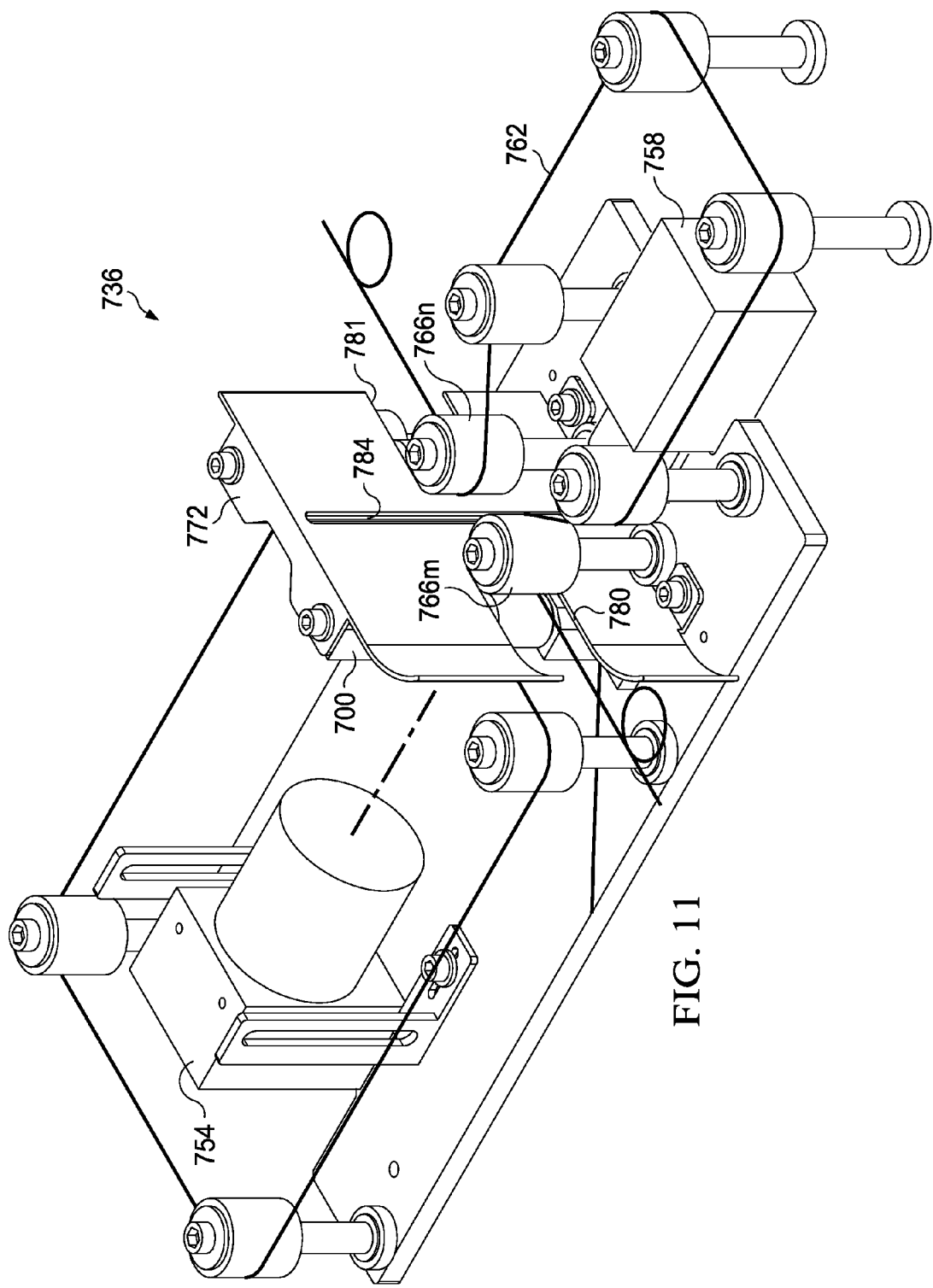
FIG. 11 is a schematic, perspective view of a document guide system using transmissive illumination to capture one or more images of a document, including a guide plate coupled to a document platen and several belts and rollers to move one or more components in the document guide system, according to an illustrative embodiment.

Referring to FIGS. 10 and 11, an illustrative embodiment of the document guide system 736 includes the imaging device 754 and the electromagnetic radiation source 758 used to capture one or more images of the document 702 as it moves in its direction of travel 703 between the guide plate 772 and the document platen 700. The document guide system 736 uses electromagnetic radiation emitted from the electromagnetic radiation source 758 and transmitted through the document 702 to the imaging device 754 so that the imaging device 754 can take one or more images of the document 702 as it passes through the document passage 774 formed by the guide plate 772 and the document platen 700. Indeed, the use of transmissive illumination may be similar, in some respects, to the transmissive document guide system 336 described in FIGS. 3, 4A, and 4B.

It is noted that the guide plate 772 has the guide plate aperture 784 that is coincident with the aperture 706 of the document platen 700 so that electromagnetic radiation transmitted by the electromagnetic radiation source 758 is able to travel to the imaging device 754. Also, as in FIGS. 8, 9A, and 9B, the roller 766m and 766n may be partially received by the entry and exit roller cutaways 780, 781, respectively, to motivate the document 702 through the document passage 774. It is noted that, in this embodiment, in contrast to the embodiment of FIGS. 8, 9A, and 9B, the belt 762 does not move fully through the document passage 774, and is instead diverted behind the electromagnetic radiation source 758 using multiple rollers.

While the document platen 700 is shown to have two rollers therein, the document platen 700 may have any number of rollers to facilitate movement of the document 702, and these rollers may be placed at various positions on the document platen 700. For example, the document platen 700 may have one or more rollers located only on either the entry portion or the exit portion of the document platen 700. In yet another embodiment, the document platen 700 may have no rollers at all.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A document guide system employing a document platen, the document guide system comprising:
    a document platen having a first, document-faceable side and a second, opposing side; and
    a document support sub-system adjacent the first side of the document platen, the document support sub-system comprising one or more bands to hold the document against the first side of the document platen when the document moves along the first side of the document platen and between the one or more bands and the first side of the document platen;
    wherein the document support sub-system and the first side of the document platen are adapted to receive a document therebetween;
    wherein the document platen forms an aperture adapted to allow electromagnetic radiation therethrough;
    wherein the second side of the document platen forms an indent having angled sides, and the aperture is located at approximately an apex of the indent; and
    wherein the document platen has an entry edge and an exit edge and the document support sub-system further comprises a first post adjacent the entry edge of the document platen, the first post having an upper portion and a lower portion, and a second post adjacent the exit edge of the document platen, the second post having an upper portion and a lower portion;
    wherein the one or more bands comprises an upper band and a lower band;
    wherein the upper band is wrapped at least partially around the upper portion of the first post at least partially around the upper portion of the second post; and
    wherein the lower band is wrapped at least partially around the lower portion of the first post and at least partially around the lower portion of the second post.

2. The document guide system of claim 1, wherein the first side of the document platen is a substantially flat surface.

3. The document guide system of claim 1, wherein the document platen has an entry edge and an exit edge, the document guide system adapted to accommodate the document to have a direction of travel from the entry edge to the exit edge of the document platen; and
    wherein the aperture is an elongated slit substantially perpendicular to the direction of travel of the document.

4. The document guide system of claim 3, wherein the document has a document has a document height; and
    wherein the length of the elongated slit meets or exceeds the document height.

5. The document guide system of claim 1, wherein the angled sides of the indent in the document platen comprise a first angled side and a second angled side;
    wherein the first angled side and the first side of the document platen form a first angle, the first angle in a range from 10 to 80 degrees;
    wherein the second angled side and the first side of the document platen form a second angle, the second angle in a range from 10 to 80 degrees.

6. The document guide system of claim 1,
    wherein the document guide system is adapted to accommodate the document to have a direction of travel from the entry edge to the exit edge of the document platen and
    wherein the one or more bands are rotatable to move the document along the first side of the document platen in the document direction of travel.

7. The document guide system of claim 1, wherein the document guide system is adapted to accommodate the document to have a direction of travel from the entry edge to the exit edge of the document platen;
    wherein at least one of the first post or the second post are rotatable to cause rotation of the upper band and the lower band; and
    wherein the rotation of the upper band and the lower band cause the document to move along the first side of the document platen in the document direction of travel.

8. The document guide system of claim 1, wherein the document platen has a tapered entry edge to guide the document into a space between the document support sub-system and the first side of the document platen.

9. The document guide system of claim 1, wherein the document platen has an entry portion and an exit portion, the document adapted to have a direction of travel from the entry portion to the exit portion of the document platen;
    wherein the document platen comprises:
        a first roller at the entry portion of the document platen; and
        a second roller at the exit portion of the document platen; and
    wherein the first roller and the second roller are rotatable to facilitate movement of the document in the document direction of travel.

10. The document guide system of claim 1, wherein the document support sub-system comprises:
    a guide plate positionable adjacent the first side of the document platen to form a document passage between the guide plate and the first side of the document platen.

11. The document guide system of claim 10, wherein the guide plate forms a guide plate aperture to allow electromagnetic radiation therethrough, the guide plate aperture substantially coincident with the aperture formed by the document platen.

12. The document guide system of claim 10, wherein the guide plate is attachable to the document platen.

13. The document guide system of claim 12, wherein the guide plate has a top side, wherein the document platen has a top side, and wherein the guide plate further comprises:
    a support lip protruding from the top side of the guide plate, the support lip protruding toward the document platen when the guide plate is in position adjacent the first side of the document platen, the support lip attachable to the top side of the document platen.

14. The document guide system of claim 10, wherein the guide plate has an entry side, the entry side of the guide plate curving away from the document platen to guide entry of the document into the document passage.

15. The document guide system of claim 10, wherein the guide plate has an entry side and an exit side;
    wherein the entry side of the guide plate forms an entry roller cutaway;
    wherein the exit side of the guide plate forms an exit roller cutaway; and
    wherein the entry roller cutaway and the exit roller cutaway are each adapted to at least partially receive a roller to motivate the document through the document passage.

16. The document guide system of claim 15, wherein the document guide system is adapted to accommodate the document to have a direction of travel from the entry side to the exit side of the guide plate, the document guide system further comprising:

a belt to hold the document against the first side of the document platen, the rollers rotatable to move the belt through the document passage, thereby causing the document to move through the document passage in the document direction of travel.

17. The document guide system of claim 1, further comprising:
one or more electromagnetic radiation sources aimed at the aperture of the document platen to illuminate at least a portion of the document at the aperture of the document platen; and
an imaging device aimed at the aperture of the document platen to capture an image of at least a portion of the document at the aperture of the document platen.

18. The document guide system of claim 17, wherein the one or more electromagnetic radiation sources and the imaging device are positioned on a same side of the document platen.

19. The document guide system of claim 1, further comprising:
one or more belts to move the document along the first side of the document platen such that the document moves at least partially over the aperture.

20. A document guide system employing a document platen, the document guide system comprising:
a document platen having a first, document-faceable side and a second, opposing side;
a document support sub-system adjacent the first side of the document platen;
one or more electromagnetic radiation sources aimed at the aperture of the document platen to illuminate at least a portion of the document at the aperture of the document platen; and
an imaging device aimed at the aperture of the document platen to capture an image of at least a portion of the document at the aperture of the document platen;
wherein the document support sub-system and the first side of the document platen are adapted to receive a document therebetween;
wherein the document platen forms an aperture adapted to allow electromagnetic radiation therethrough;
wherein the second side of the document platen forms an indent having angled sides, and the aperture is located at approximately an apex of the indent; and
wherein the one or more electromagnetic radiation sources are positioned on an opposite side of the document platen than the imaging device.

21. A document guide system employing a document platen, the document guide system comprising:
a document platen having a first, document-faceable side and a second, opposing side, the document platen further having an entry portion and an exit portion, the entry portion having an entry edge and the exit portion having an exit edge, wherein the document platen further comprises:
a first roller coupled to the document platen and located at least partially within a cutout portion of the entry edge of the document platen; and
a second roller coupled to the document platen and located at least partially within a cutout portion of the exit edge of the document platen and
a document support sub-system adjacent the first side of the document platen, the document support sub-system comprising a guide plate positionable adjacent the first side of the document platen to form a document passage between the guide plate and the first side of the document platen;
wherein the document support sub-system and the first side of the document platen are adapted to receive a document therebetween, the document having a direction of travel from the entry portion to the exit portion of the document platen;
wherein the document platen forms an aperture adapted to allow electromagnetic radiation therethrough; and
wherein the first roller and the second roller are rotatable to facilitate movement of the document in the document direction of travel;
wherein the guide plate is attachable to the document platen; and
wherein the guide plate has a top side, the document platen has a top side, and the guide plate further comprises a support lip protruding from the top side of the guide plate, the support lip protruding toward the document platen when the guide plate is in position adjacent the first side of the document platen, the support lip attachable to the top side of the document platen.

22. The document guide system of claim 21, wherein the first roller and second roller are motivated to rotate using one or more belts such that the first roller and the second roller are adapted to move the document in the document direction of travel.

23. A document guide system employing a document platen, the document guide system comprising:
a document platen having a first, document-faceable side and a second, opposing side, the document platen further having an entry edge and an exit edge;
a document support sub-system adjacent the first side of the document platen, wherein the document support sub-system and the first side of the document platen are positioned to allow a document to pass between the document support sub-system and the first side of the document platen, and wherein the document platen forms an aperture located at approximately a midpoint between the entry edge and the exit edge;
one or more electromagnetic radiation sources aimed at the aperture of the document platen to illuminate at least a portion of the document platen; and
an imaging device aimed at the aperture of the document platen to capture an image of at least a portion of the document at the aperture of the document platen, the imaging device positioned on an opposite side of the document platen than the document support sub-system, the imaging device having a line of sight substantially perpendicular to the first side of the document platen,
wherein the document support sub-system comprises a guide plate positionable adjacent the first side of the document platen to form a document passage between the guide plate and the first side of the document platen;
wherein the document guide system further comprises a belt to hold the document against the first side of the document platen and move the document through the document passage and across the aperture of the document platen;
wherein the one or more electromagnetic radiation sources are positioned on the opposite side of the document platen as the imaging device; and
wherein the imaging device is adapted to capture the image of the at least a portion of the document using electromagnetic radiation from the one or more electromagnetic radiation sources that is transmitted through the document.

24. The document guide system of claim 23, wherein the one or more electromagnetic radiation sources are positioned on the same side of the document platen as the imaging device;
   wherein each of the one or more electromagnetic radiation sources has a line of sight;
   wherein the line of sight of each of the one or more electromagnetic radiation sources forms an angle with the line of sight of the imaging device that is greater than zero (0) degrees; and
   wherein the imaging device is adapted to capture the image of the at least a portion of the document using electromagnetic radiation from the one or more electromagnetic radiation sources that is reflected off a surface of the document.

25. The document guide system of claim 23, wherein the one or more electromagnetic radiation sources is a single electromagnetic radiation source having a line of sight substantially perpendicular to the first side of the document platen.

26. The document guide system of claim 23, wherein the document support sub-system comprises one or more bands to hold the document against the first side of the document platen, the one or more bands rotatable to move the document along the first side of the document platen and between the one or more bands and the first side of the document platen.

* * * * *